(12) United States Patent
York

(10) Patent No.: US 11,396,256 B2
(45) Date of Patent: Jul. 26, 2022

(54) CHASSIS ASSEMBLY FOR INSTALLATION IN A BED OF A PICKUP TRUCK

(71) Applicant: Jeffrey L York, Grand Junction, CO (US)

(72) Inventor: Jeffrey L York, Grand Junction, CO (US)

( * ) Notice: Subject to any disclaimer, the term of this patent is extended or adjusted under 35 U.S.C. 154(b) by 317 days.

(21) Appl. No.: 16/802,301

(22) Filed: Feb. 26, 2020

(65) Prior Publication Data

US 2020/0276927 A1 Sep. 3, 2020

Related U.S. Application Data

(60) Provisional application No. 62/811,676, filed on Feb. 28, 2019.

(51) Int. Cl.

| | | |
|---|---|---|
| *B60P 3/42* | (2006.01) | |
| *B62D 65/02* | (2006.01) | |
| *B62D 33/02* | (2006.01) | |
| *B60Q 1/50* | (2006.01) | |
| *B60R 9/06* | (2006.01) | |
| *B66F 3/46* | (2006.01) | |
| *B60R 16/03* | (2006.01) | |
| *E01F 9/70* | (2016.01) | |

(52) U.S. Cl.
CPC ................ *B60P 3/42* (2013.01); *B60Q 1/503* (2013.01); *B60R 9/06* (2013.01); *B60R 16/03* (2013.01); *B62D 33/0207* (2013.01); *B62D 33/0222* (2013.01); *B62D 65/024* (2013.01); *B66F 3/46* (2013.01); *E01F 9/70* (2016.02)

(58) Field of Classification Search
CPC ... B60P 3/42; B60Q 1/503; B60R 9/06; B60R 16/03; B62D 33/0207; B62D 33/0222; B62D 65/024; B66F 3/46
See application file for complete search history.

(56) References Cited

U.S. PATENT DOCUMENTS

| | | | | |
|---|---|---|---|---|
| 3,409,154 A | * | 11/1968 | Rasmussen | ............. E01F 9/662 |
| 3,883,020 A | * | 5/1975 | Dehn | ...................... B60P 1/003 |
| | | | | 224/511 |
| 3,883,846 A | | 5/1975 | Bruner | |
| 4,077,144 A | * | 3/1978 | Smits | ...................... E01F 9/662 |
| | | | | 40/590 |
| 4,597,706 A | | 7/1986 | Michit | |
| 5,054,648 A | | 10/1991 | Luoma | |
| 5,203,364 A | * | 4/1993 | Koole | ...................... B60P 3/42 |
| | | | | 296/100.1 |

(Continued)

*Primary Examiner* — Brian D Nash
(74) *Attorney, Agent, or Firm* — Leyendecker & Lemire

(57) ABSTRACT

An easily attachable and removable self-contained slide in storage, safety and warning light chassis assembly for use by the traffic control industry and others is described. The chassis assembly includes a bed portion that is built to slide into a pickup truck bed. Associated removable jacks can be used to raise and support the chassis while a truck is backed up under it, or where the jacks include castors, the assembly is rolled into the truck. Additionally, a safety platform portion is included on the rear portion of the chassis assembly, so that when installed it is disposed behind the bed of the truck for use in the placement and pickup of traffic control devises. The chassis assembly can be mounted securely to the factory hitch of truck as well as additional locations in the bed.

19 Claims, 10 Drawing Sheets

(56) References Cited

U.S. PATENT DOCUMENTS

| | | | | |
|---|---|---|---|---|
| 5,476,301 | A | * | 12/1995 | Berkich .................... B60R 9/00 |
| | | | | 224/403 |
| 5,593,272 | A | * | 1/1997 | Green ....................... B60P 1/04 |
| | | | | 414/498 |
| 6,183,042 | B1 | | 2/2001 | Unrath |
| 6,364,400 | B1 | * | 4/2002 | Unrath ..................... E01F 9/70 |
| | | | | 296/25 |
| 6,496,123 | B2 | * | 12/2002 | Brinkman ............ G08G 1/0955 |
| | | | | 340/471 |
| 9,056,572 | B2 | | 6/2015 | Hemphill |
| 10,160,373 | B2 | * | 12/2018 | Tovornik .................. B60P 3/14 |
| 10,319,227 | B2 | * | 6/2019 | Roy ...................... G09F 21/048 |
| 2007/0001473 | A1 | * | 1/2007 | Eidsmore ................. B60P 1/24 |
| | | | | 296/26.08 |
| 2011/0205085 | A1 | | 8/2011 | Legare |
| 2015/0043231 | A1 | | 2/2015 | Clark |
| 2015/0166198 | A1 | | 6/2015 | Hokanson |
| 2017/0106780 | A1 | | 4/2017 | Tovornik |
| 2017/0136956 | A1 | | 5/2017 | Johnson |
| 2018/0092285 | A1 | | 4/2018 | Centerbar |
| 2018/0261088 | A1 | | 9/2018 | Roy |

\* cited by examiner

`US 11,396,256 B2`

CHASSIS ASSEMBLY FOR INSTALLATION IN A BED OF A PICKUP TRUCK

RELATED APPLICATIONS

This application claims priority to and incorporates by reference U.S. Provisional Application No. 62/811,676 filed on Feb. 28, 2019 having the title Slide in Storage and Safety Chassis for a Pickup Truck and having the same inventor as the present application.

BACKGROUND

Crew and traffic control trucks typically comprise flat bed trucks that have a chassis permanently or semi-permanently installed thereon. The typical chassis includes racks and shelving for equipment, sign and traffic cone storage, safety lights and lighted arrow boards for directing traffic, and often a berth for a road worker to use when placing or removing traffic cones from a road.

While these trucks and the associated chassis are well suited to their intended uses, they are not suitable for other uses that a general purpose pickup truck can handle, such as the hauling and transport of larger pieces of equipment or granular material. Further, removal of the Chassis from a flat bed and installing another type of chassis is generally time consuming and costly negating any practicality of doing so. Accordingly, road crews and road construction companies may have to invest in both trucks equipped with chassis for road safety use, as well as, pickup trucks or other trucks designed for transporting large equipment and/or loose materials.

DETAILED DESCRIPTION

Figure 1:
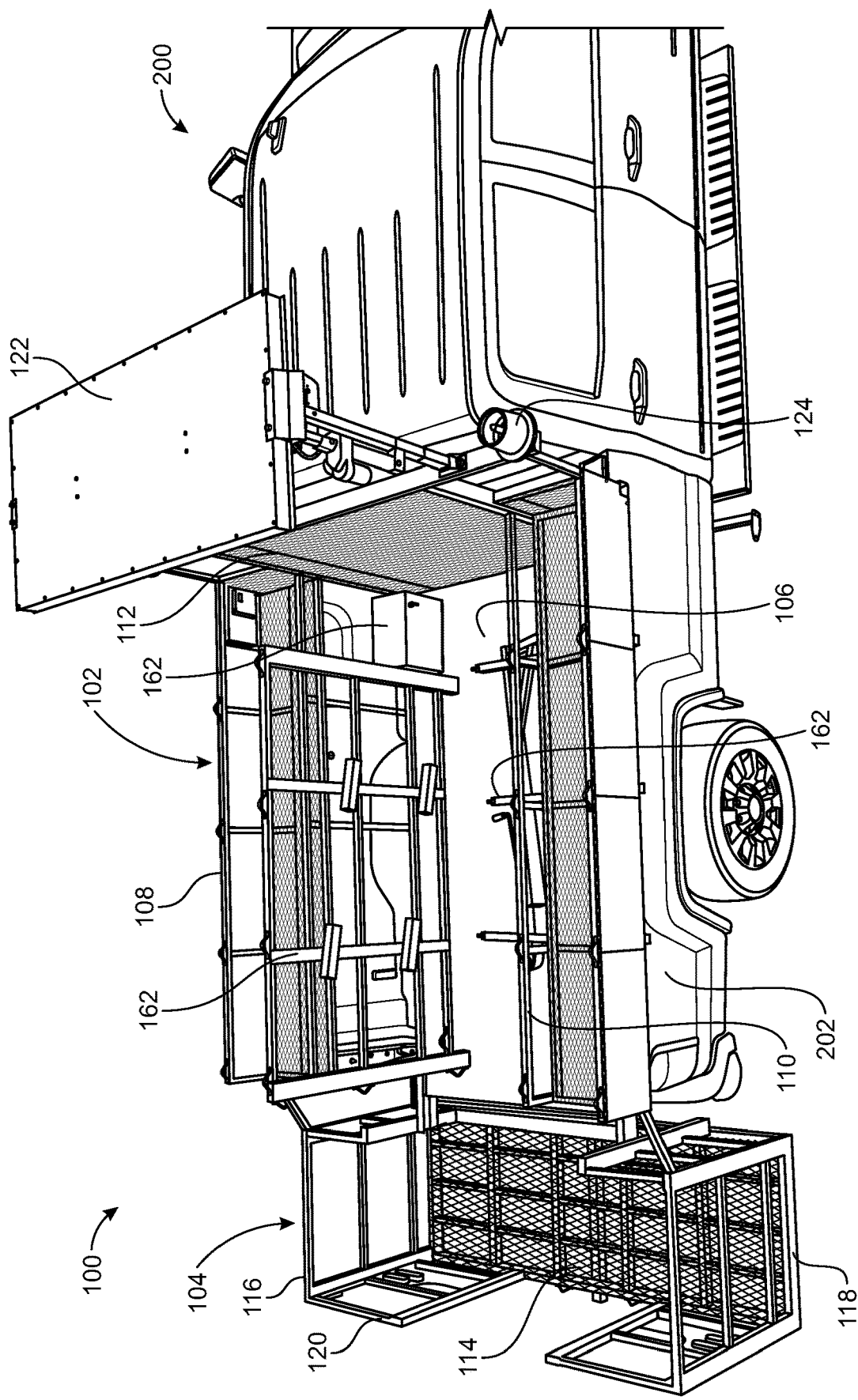
FIG. 1 is a perspective view of the chassis assembly installed on a pickup truck with a lighted arrow board in the deployed position according to an embodiment of the present invention.

Embodiments of the present invention comprise an easily attachable and removable self-contained slide in storage, safety and warning light chassis assembly for use by the traffic control industry and others. The chassis assembly includes a bed portion that is built to slide into a pickup truck bed in contrast with prior art chassis that are primarily designed and configured for permanent and semi-permanent attachment to a flatbed truck. In at least one embodiment, associated removable jacks can be used to raise and support the chassis while a truck is backed up under it, or where the jacks include castors and the assembly is rolled into the truck. Additionally, embodiments include a safety platform portion that is built on the rear portion of the chassis assembly, so that when installed it is disposed behind the bed of the truck for use in the placement and pickup of traffic control devises. Embodiments of the chassis assembly can be mounted securely to the factory hitch of truck as well as additional locations in the bed.

The body portion of the chassis is typically designed to safely secure and store traffic control devices such as cones, signs, and sign stands. The body portion often further incorporates all tail lights, flashing strobe lights, flashing bubble strobes, and an arrow board as is typically required of vehicle used by the traffic control industry. The wiring can tied into the pickup's factory tail light plug for power. Some embodiments can also have batteries and solar panels for providing power generally and specifically to the arrow board. The control switches for strobes and arrow board can be mounted in the cab of the truck and/or mounted in or on the chassis itself.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

Embodiments of a Chassis Assembly

FIGS. 1-13 depict an embodiment of the chassis assembly and its various elements either alone or in combination with a pickup truck. The chassis assembly 100 is typically comprised of a bed portion 102 intended for receipt in the bed 202 of a pickup truck 200, and a safety platform portion 104 that extends off a backside of the bed portion and has a floor 114 disposed at a lower height than the floor 106 of the bed portion.

The bed portion 102 includes a floor 106 that when installed rests upon the floor 206 of the pickup truck bed 202. The floor is typically comprised of steel plate but can also be comprised of other materials and can also comprise sheet grate. The floor structure as well as the structure of the rest of the bed portion and the safety platform portion can include a framework of metal tubing, elongated channel and angle formed, welded, mechanically attached and/or adhesively attached to form a sufficiently rigid structure that can handle the rigors of its intended use.

A left side 108 and a right side 110 extend upwardly from the floor, such that they are typically located adjacent the left and right sides of the truck bed 102 when installed therein. The sides can comprise any suitable materials and take on any suitable configuration, but are typically comprised of one or more of sheet metal, sheet grate, metal tubing and elongated angle and channel. In at least some embodiments the sidewalls form horizontal shelves 132 that are disposed above the top sides of the respective sides of the truck bed. The shelves as shown have sheet grate floors although other types of floors can be utilized as well.

The sides 108 & 110 can include other various shelves, racks, posts boxes and other accoutrements 162 attached thereto to safely stow and store equipment necessary to carry out the job of a road safety worker. For instance a box can be provided to store small parts, such as light bulbs, nut and bolts, that would otherwise roll around unrestrained. Racks can be provided in which traffic signs can be stored vertically.

Figure 2:
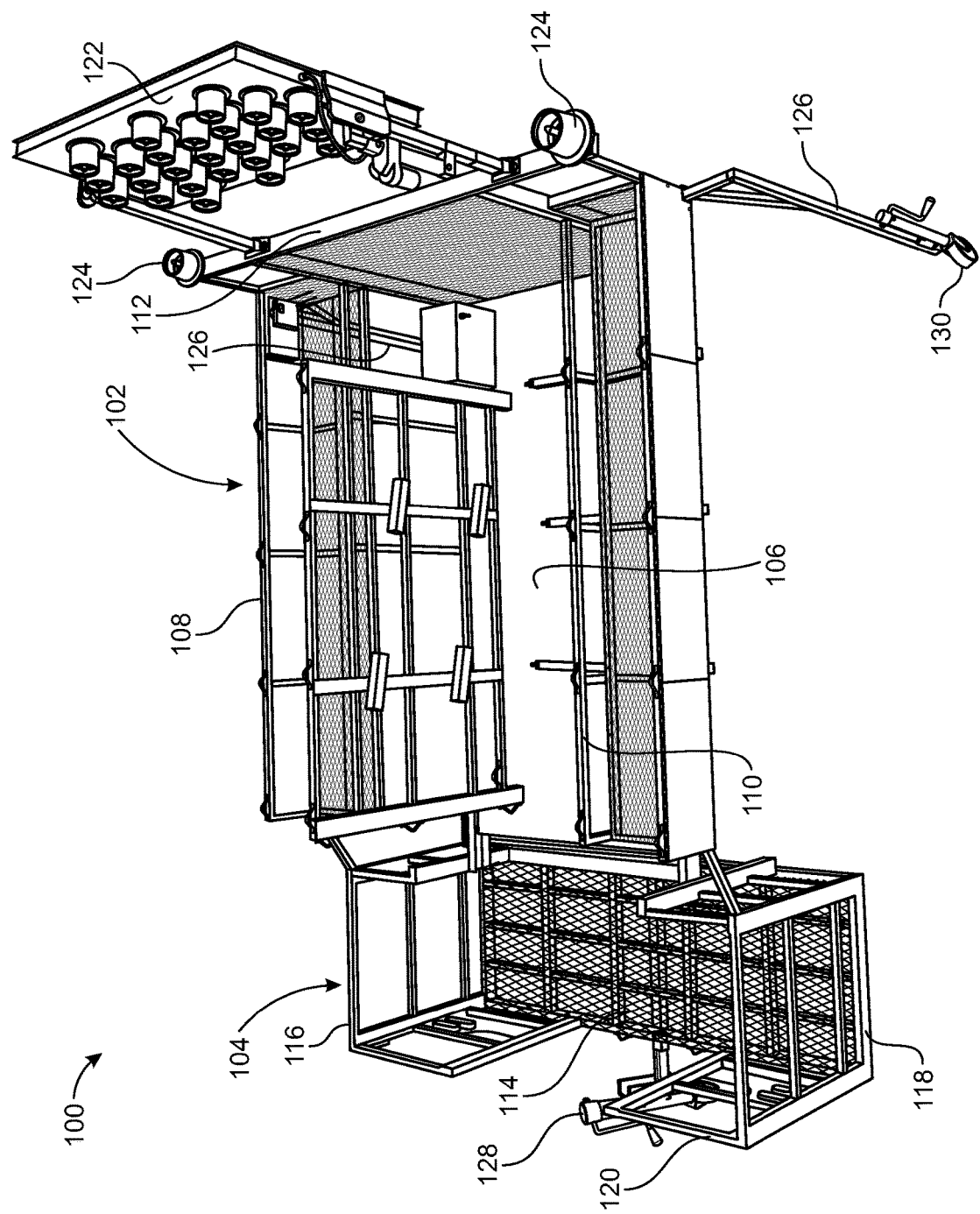
FIG. 2 is a perspective view of the chassis assembly supported by removable jacks according to an embodiment of the present invention.
Figure 3:
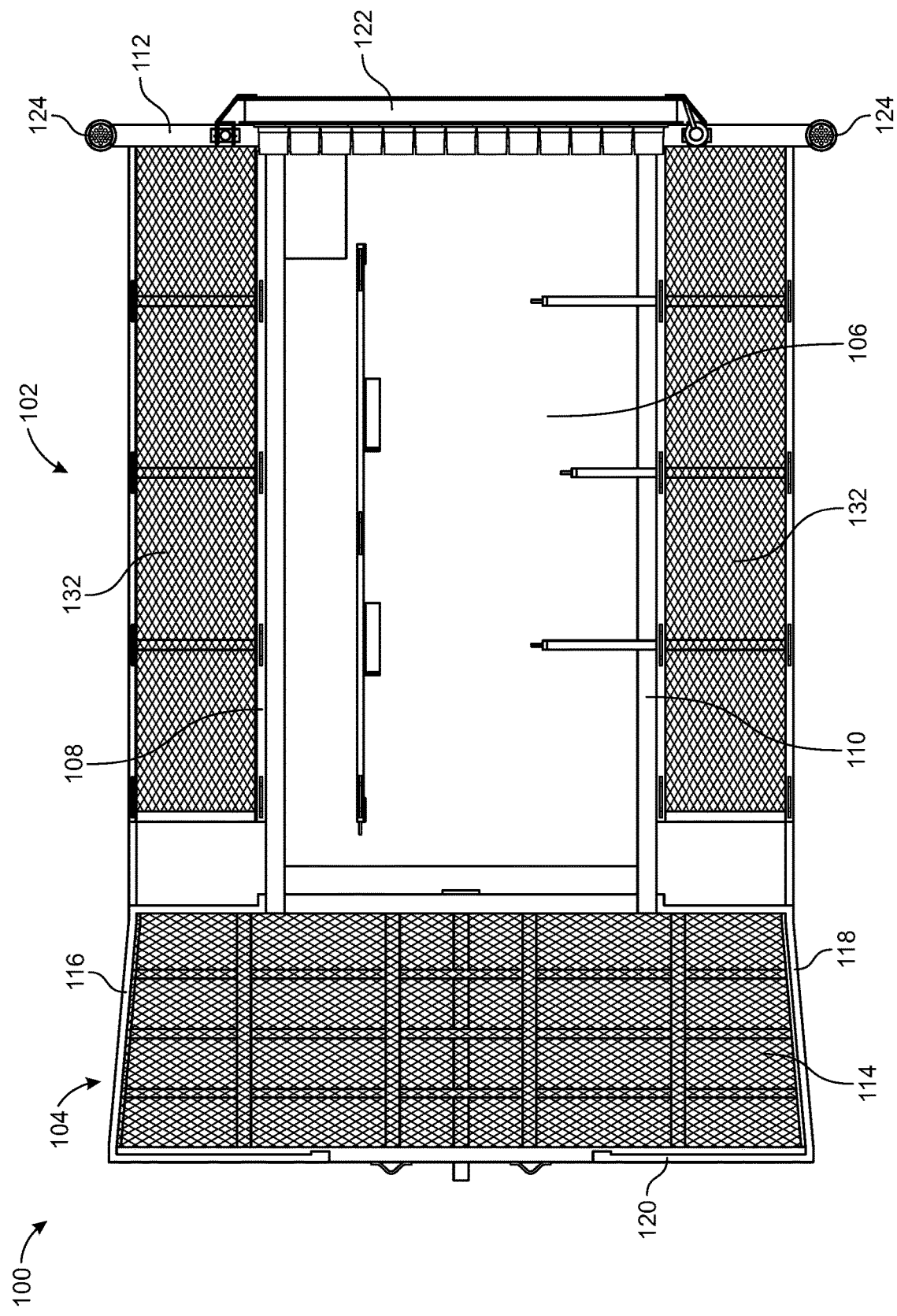
FIG. 3 is a top view of the chassis according to an embodiment of the present invention.
Figure 4:
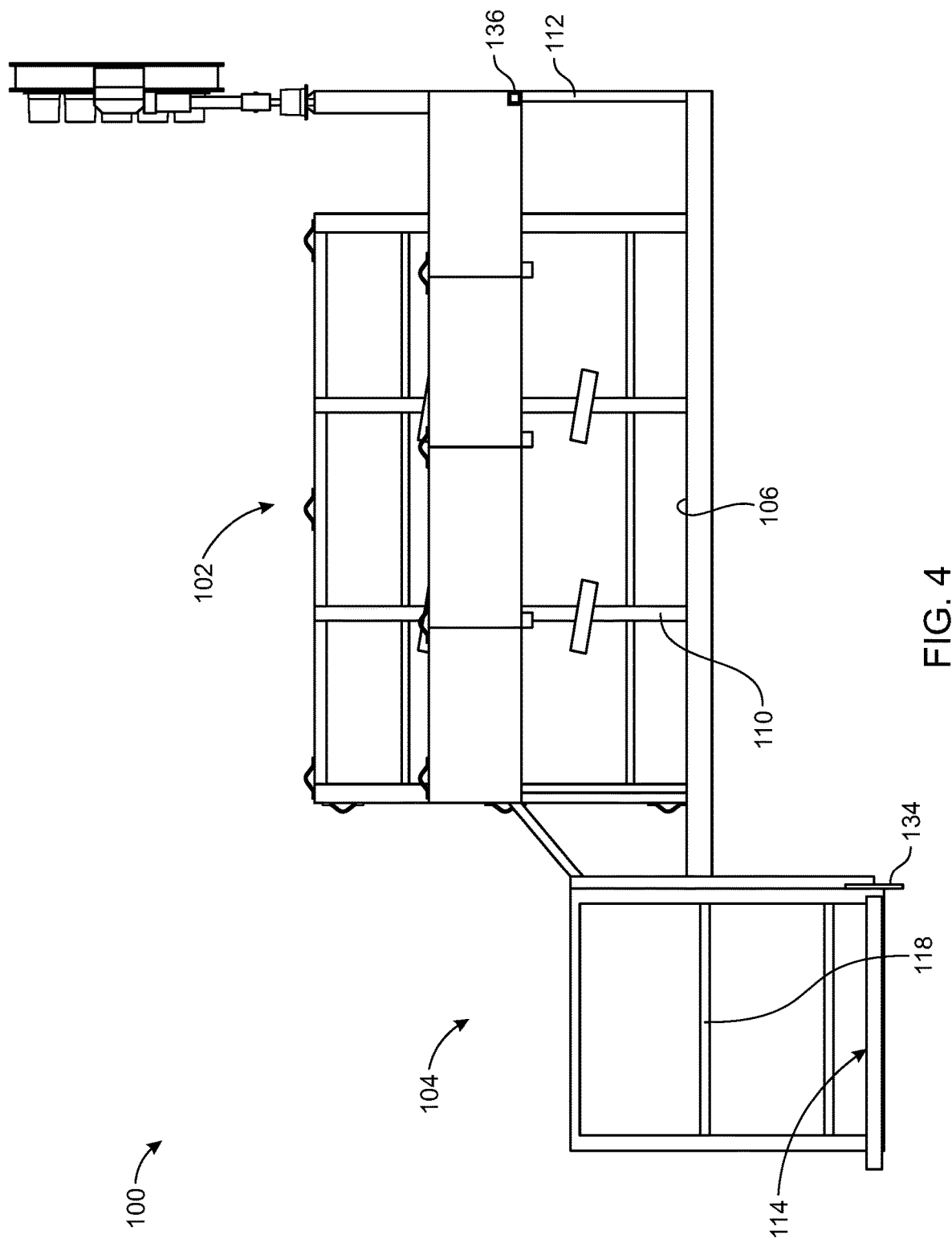
FIG. 4 is a side of the chassis according to an embodiment of the present invention.
Figure 5:
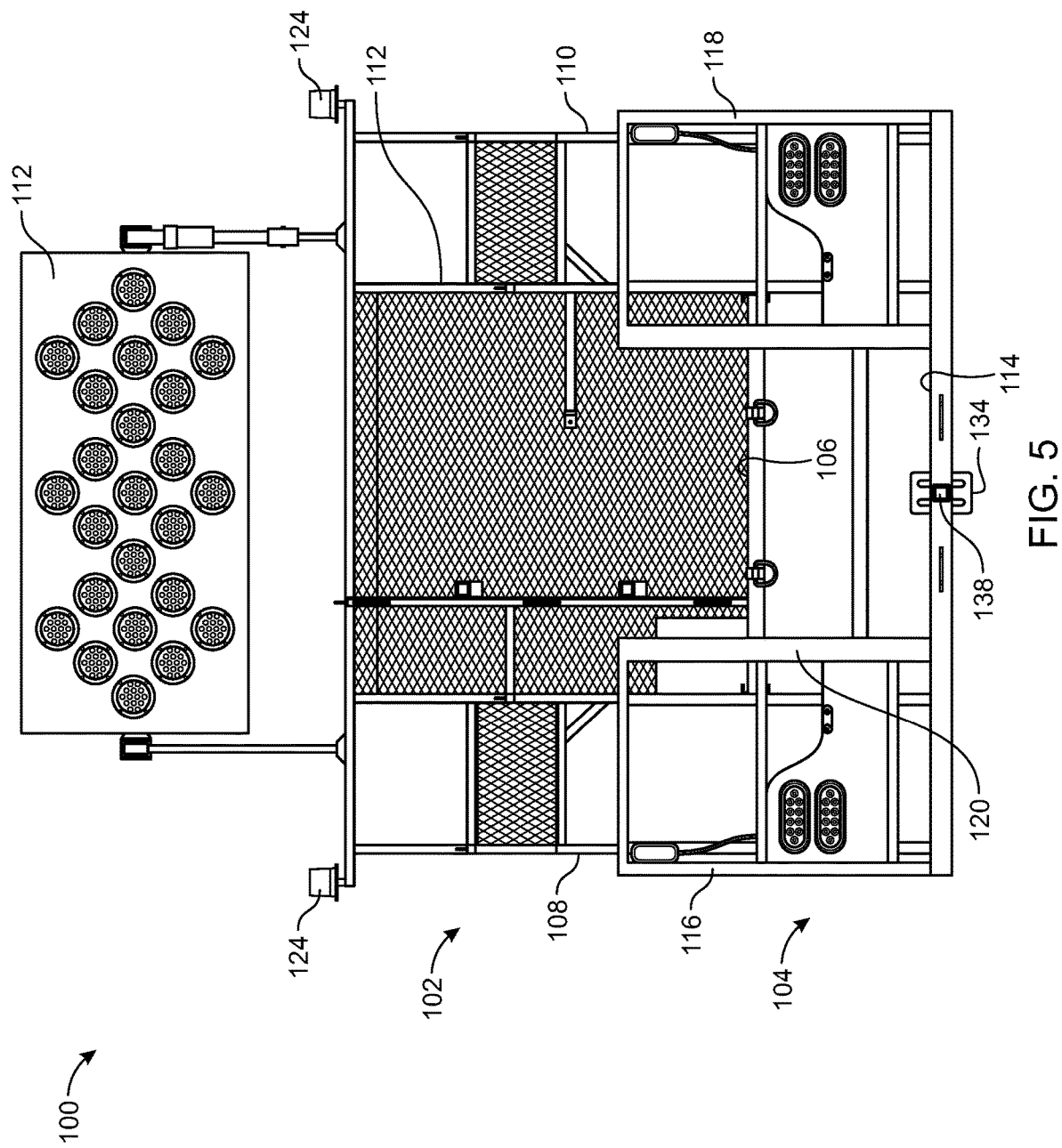
FIG. 5 is a rearview of the chassis according to an embodiment of the present invention.
Figure 6:
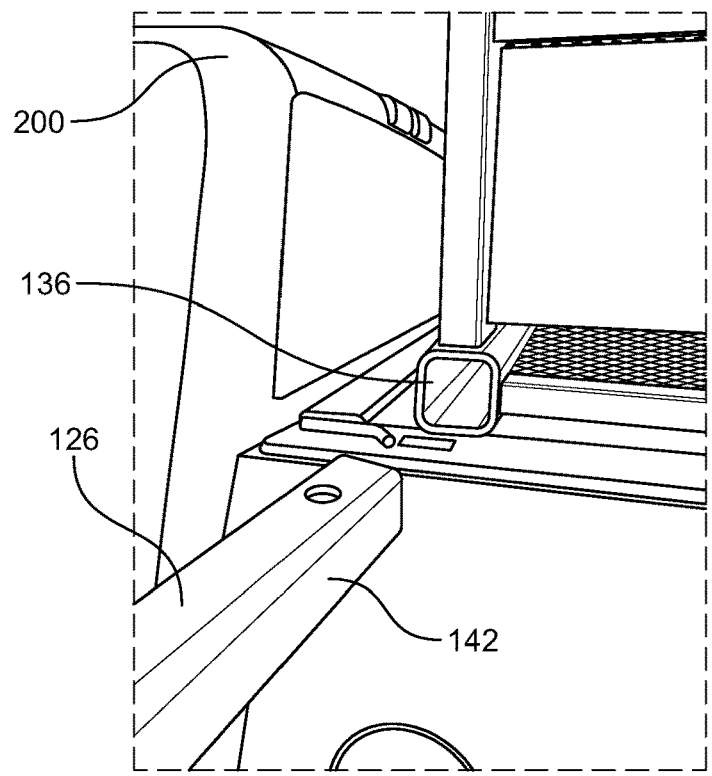
FIG. 6 is close up view of a front jack receiving mount according to an embodiment of the present invention.
Figure 7:
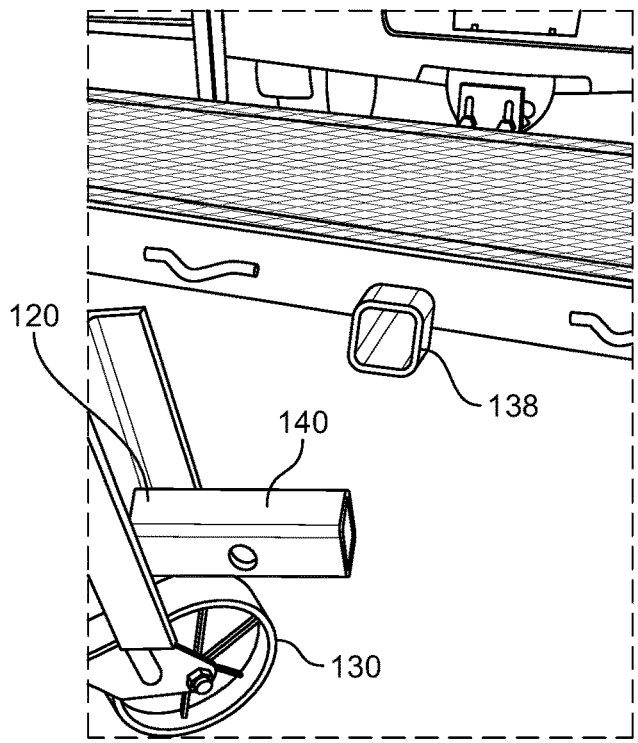
FIG. 7 is close up view of a rear jack receiving mount according to an embodiment of the present invention.

A front side 112 also extends upwardly from the bed portion 102. When the chassis assembly is installed in a pickup truck 200 the front side is located adjacent to the rear wall of the truck's cab. Accordingly, the front side often comprises sheet grate that a driver of the truck can see through. Typically, extending upwardly from the top of the front side is a lighted arrow board 122. The arrow board can be moved between a substantially horizontal stowed position (FIG. 1) and a substantially vertical deployed position (FIG. 2). Signal lights or strobes 124 can also be located on the top side of the front side as shown.

The arrow board 122, and the other lights and strobes 124 present on the chassis assembly are coupled to an electrical harness as out any other electric components of the chassis, such as a controller. The electrical harness typically includes a plug designed to plug into the taillight receptacle of the pickup truck that is provided to make an electrical connection with a trailer. The controller may be provided and may interface with a wired or wireless that will permit a person located in the cab to actuate the lights on the chassis including the arrow board. The controller through the remove may also be configured to turn on a motor used to move the arrow board between stowed and deployed positions. In some variations, the chassis can include batteries and/or solar panels to augment power provided by the associated vehicle or permit the chassis to be power independent from the truck.

The safety platform portion 104 is located behind the bed portion extending rearwardly from a back edge of the bed portion 102. It is attached to the bed portion typically by way of one or more of tubing, angle and channel that is also secured to one or more of the floor 106, left side 108 and right side 110 of the bed portion. It is characterized by a floor 114 that is positioned about 18-22 inches below the floor of the bed portion, and at least left, right and rear side railings 116, 118 & 120. The side railing extend upwardly from the floor along the edges thereof. They are of suitable height and strength to permit a road worker to lean against the railings while standing on the platform and either placing or removing traffic cones to and from a road surface. An opening may be provided in the rear railing to allow ingress and egress by road safety personnel. A chain or door may also be provided across the opening.

Figure 8:
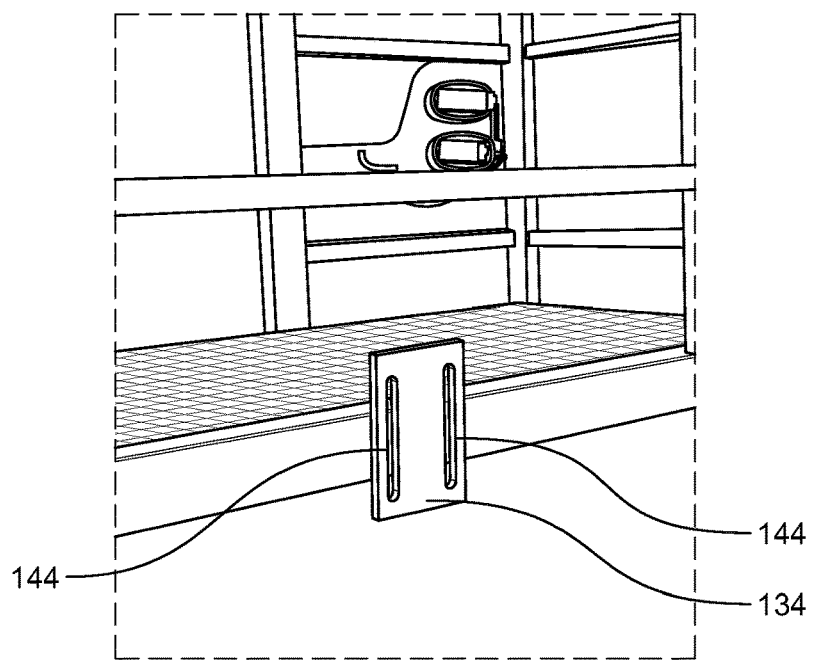
FIG. 8 is a close up view illustrating the trailer hitch mount of the chassis assembly according to an embodiment of the present invention.

Of significance in attaching the chassis assembly to the truck in which it is received, a trailer hitch mount 134 is provided along a front edge of the floor of the safety platform as best shown in FIG. 8. In the illustrated embodiment, the hitch mount comprises a plate having a pair of spaced vertically-orientated slots extending there through.

Figure 12:
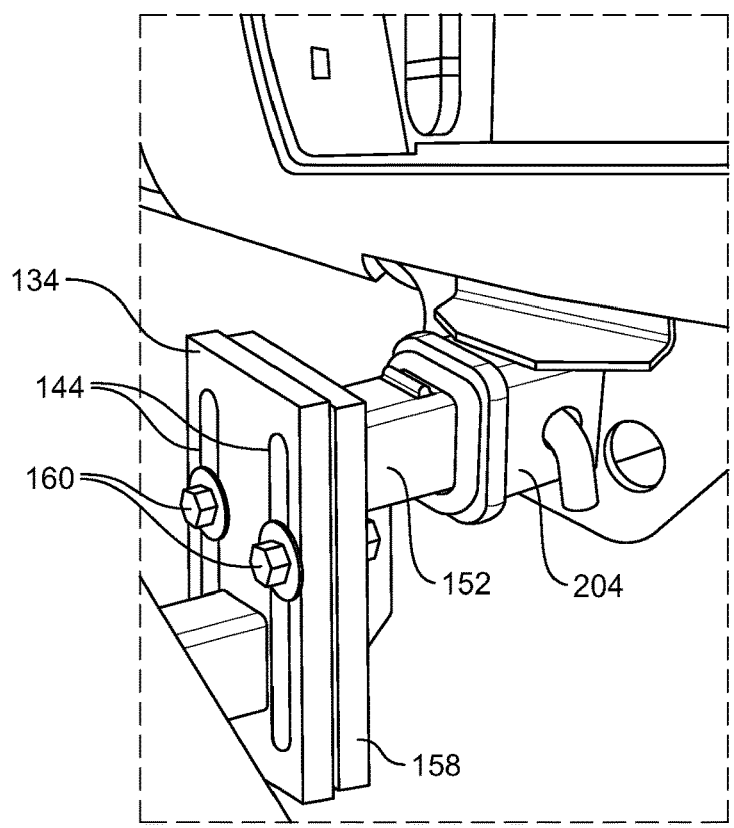
FIG. 12 is a close up perspective view illustrating the trailer hitch mount attached to the trailer hitch receiver of the pickup truck by way of the trailer hitch adapter.
Figure 13:
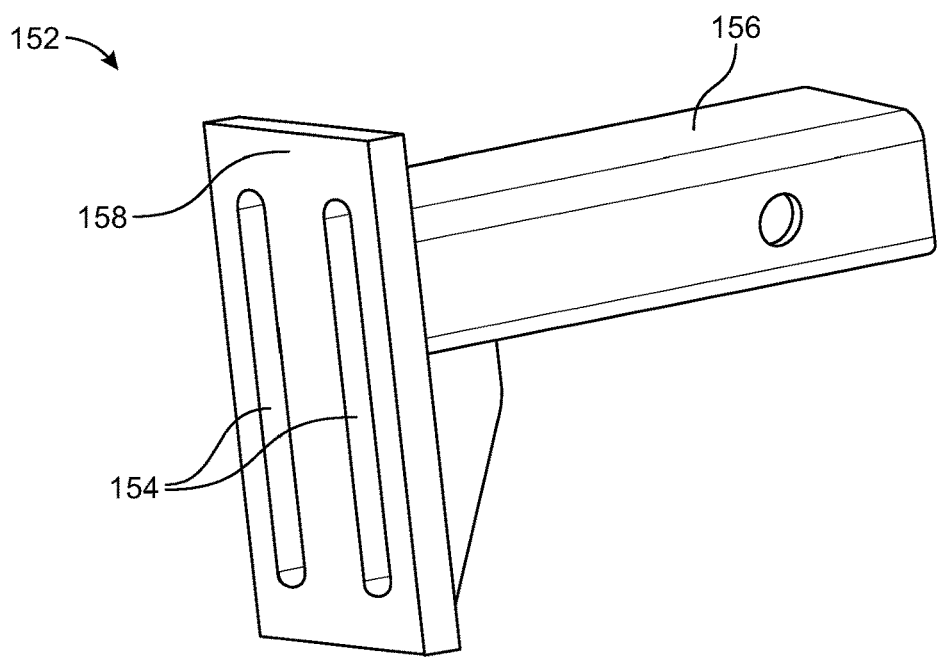
FIG. 13 is a perspective view of the trailer hitch adapter a perspective view of a front removable jack according to an embodiment of the present invention.

The hitch mount 134 interfaces with a trailer hitch adapter 152, which shown in FIG. 13. The hitch mount adapter permits the chassis assembly to be secured to the pickup truck by way of the pickup truck's trailer hitch receiver 204. The adapter also includes a plate 158 with two spaced vertically orientated slots that are configured to line up with the slots on the trailer hitch mount 134 and be joined together with two or more bolts 160 (see FIG. 12). A square tube 156 extends outwardly from one side of the plate and is configured to be received into the trailer hitch receiver. A bore is also provided through the side of the tube through which a securing rod can be received to secure the adapter to the trailer hitch receiver. FIG. 12 illustrates how the chassis assembly is attached with the pickup truck with the trailer hitch mount and the trailer hitch adapter.

Figure 11:
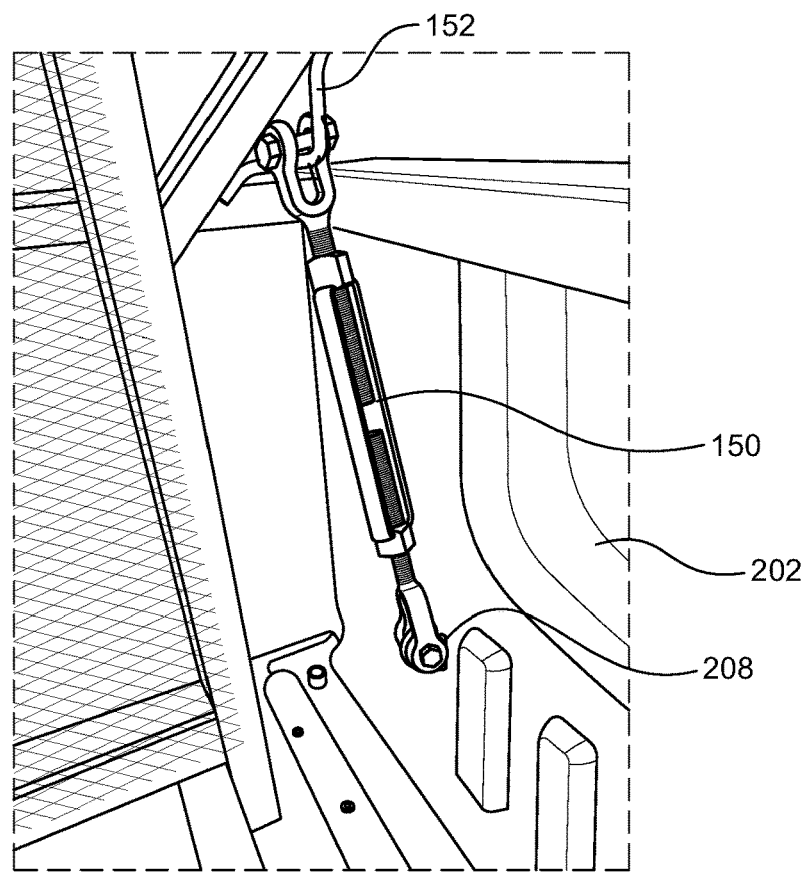
FIG. 11 is a close up view illustrating the attachment of the chassis assembly to the pickup truck by way of a turnbuckle a perspective view of a front removable jack according to an embodiment of the present invention.

The chassis assembly 100 can be further or alternatively secured to the truck bed 202 with one or more turnbuckles 150 as shown in FIG. 11. As shown, the upper clevis of the turnbuckle is attached to a metal loop 152 on the framework of the front side of the bed portion with the lower clevis of the turnbuckle being attached to a tie down loop 208 located on a sidewall of the bed.

Figure 9:
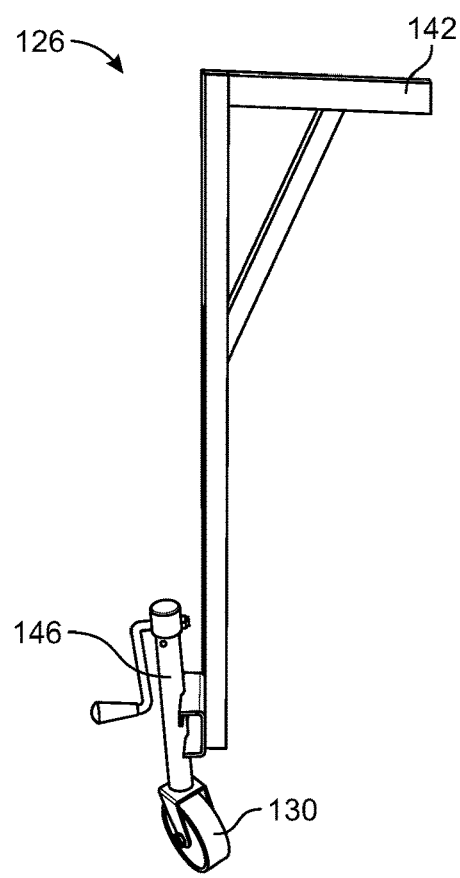
FIG. 9 is a perspective view of a front removable jack according to an embodiment of the present invention.
Figure 10:
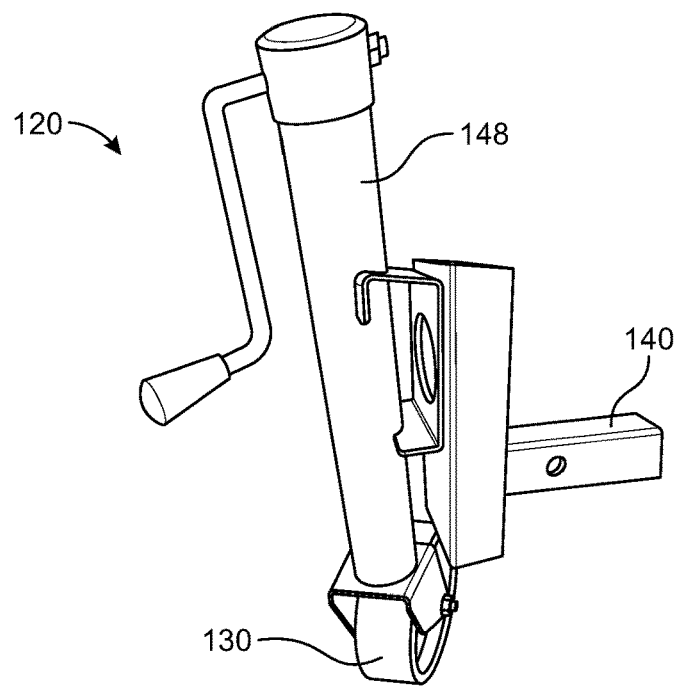
FIG. 10 is a perspective view of a rear removable jack according to an embodiment of the present invention.

FIGS. 9 & 10 illustrate removable front and rear jacks 126 & 120 that can be used in both the installation and removal of the chassis assembly 100 from a truck bed 202. The front jack is substantially taller than the rear jack and includes a height adjustment mechanism 146 that includes a caster on its bottom end and is attached to a generally L-shaped structure with a connector tube 142 that is adapted for receipt into a front jack receiver 136 near the front of the bed portion 102. Typically, a pair of right and left front jacks are utilized to support the chassis.

The removable rear jack 120 as shown in FIG. 10 is similar to front jack having a height adjustment mechanism 148 with a caster 130. Additionally, a roughly T-shaped structure is attached to the adjustment mechanism that includes a connector tube 140. This connector tube is configured for receipt in a rear jack receiver 138 located near the center of the rear side of the safety platform portion 104. Typically, only a single rear jack is utilized to support the chassis.

Figure 14A:
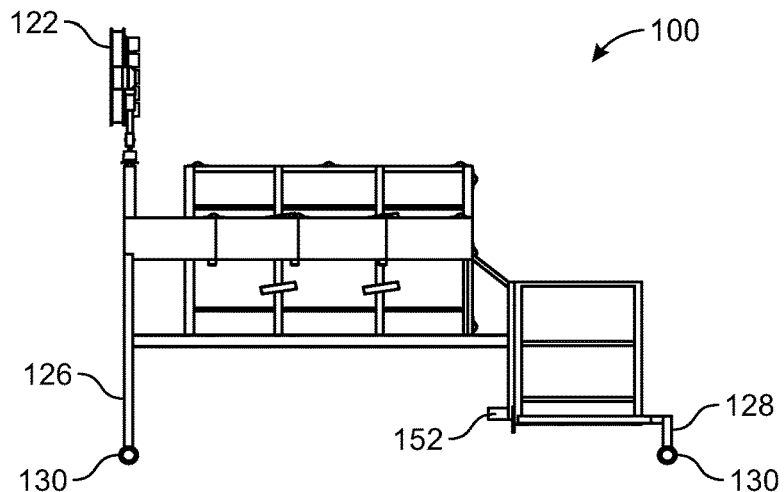
FIGS. 14A-C illustrate the manner in which the chassis assembly is installed in the bed of a pickup truck according to an embodiment of the present invention.

FIG. 2 shows the chassis assembly 100 supported by two front jacks 126 and one rear jack 128. When supported on these jacks the chassis can be easily and quickly installed within a bed 202 or removed from a bed. Installation and removal of is described with reference to FIGS. 14A-C.

The chassis assembly 100 is typically stored in a lot or yard with the front and rear jacks 126 & 128 attached. Because the jacks rest on casters 130, one or two people can roll the assembly with relative ease over a paved or finished surface. To first install the jacks on the remainder of an assembly it is lifted to a suitable height such as with an overhead crane or hoist, other jacks, or even a fork lift to name a few of initial devices that could be used to lift the chassis. Next, the jacks are attached to the chassis and secured thereto. In some variations, the front and rear jack tubes are secured in the corresponding jack receiving tubes using a securing rod in a manner similar to which the hitch mount adapter is secured to the truck receiver.

Figure 14B:
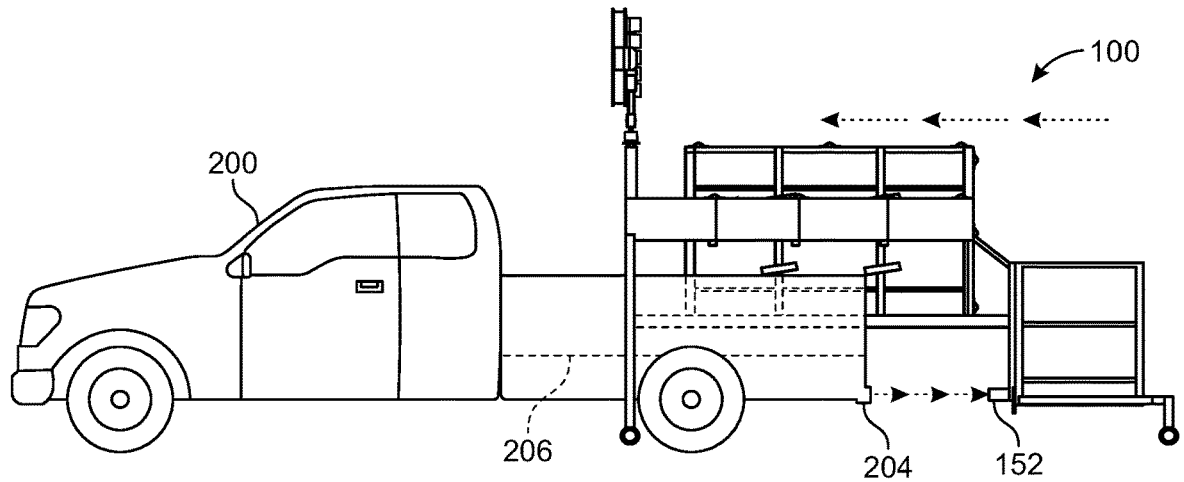
Figure 14C:
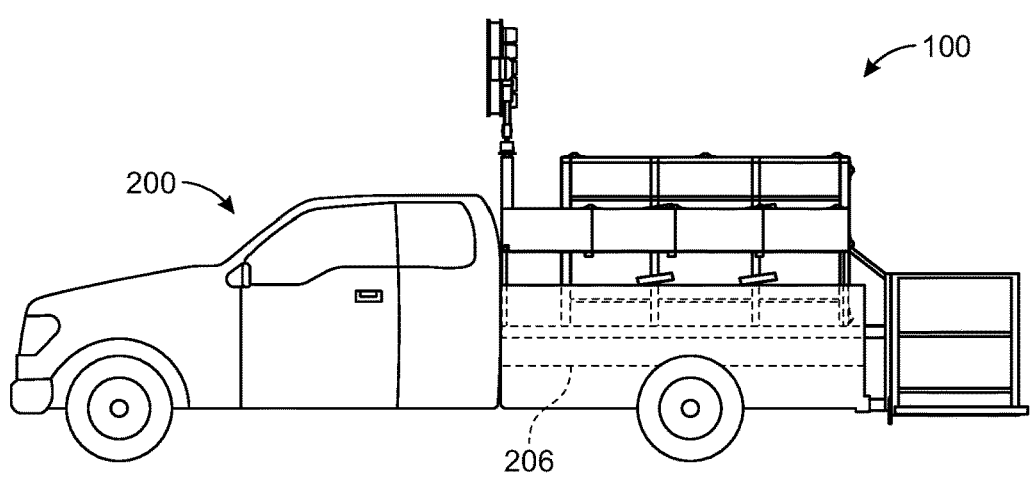

To prepare the chassis assembly 102 for installation in a pickup truck 200, the height of the assembly is adjusted using the jacks 126 & 128 so that the height of the bottom surface of the bed portion floor above an underlying ground surface is higher than the height of the truck bed floor typically by an inch or more. The chassis is then typically rolled into the truck bed as shown in FIG. 14B. Alternatively, the truck can be backed under the bed portion although more control is usually afforded by pushing chassis assembly in place.

As the assembly is mostly received in the bed 202, care is taken to align the trailer hitch mount with the trailer hitch receiver 204 to facilitate their attachment by way of the trailer hitch adapter 152. The attachment between the receiver and the hitch mount can be accomplished in a number of ways. In a one method, the adapter is loosely bolted to the trailer hitch mount such that it can slide upwardly and downwardly along the corresponding slots 144 & 154. As the adapter 152 gets close to the receiver tube 204 the assembly is moved left or right to align the tubes horizontally, and as necessary the chassis assembly 102 is raised or lowered by way of the removable jacks to align the tubes vertically. Once aligned, the adapter tube 156 is slid into the receiver tube and secured therein. The securing bolts 160 are typically not tightened at this point as additional sliding of the plates 158 & 134 will occur as the chassis assembly is lowered into place.

In another method, the adapter tube 158 of the trailer hitch adapter 152 is secured in the receiver tube 204, and chassis assembly 100 is maneuvered left, right, up and down until the slots 144 & 154 on both the trailer hitch mount and the adapter are at least partially aligned. Once sufficiently aligned bolts 160 can be placed in the slots and lightly tightened to permit the plates to slide relative to each other as the chassis is lowered into place.

Next, the bed portion 102 of the chassis assembly is lowered onto the floor 206 of the truck bed 202 by way of the removable jacks 126 & 128. The jacks can then be removed and the trailer hitch mount to trailer hitch adapter bolts 160 can be tightened. To further secure the assembly in place, turnbuckles 150 can be installed as shown in FIG. 11. The removable jacks can also be removed and stored for future use.

Removing the chassis assembly 100 from a truck 200 is essentially the opposite of its installation. The trailer hitch mount 134 and trailer hitch receiver 204 are disconnected and, as equipped the turnbuckles 150 are disconnected. The removable jacks 126 & 128 are installed on the assembly, and the height of the assembly is raised until the bottom of the bed portion floor 106 is sufficiently higher than the top surface of the bed's floor 206. The chassis assembly can then be rolled from the bed or the truck can be driven forward.

Other Variations and Embodiments

Embodiments of the chassis can be configured for installation in mid-sized pickup trucks as well. Other embodiments can primarily comprise aluminum and may not include a chassis floor to reduce chassis weight as can be desirable for smaller trucks with a lower payload capacity. Additionally, removeable jacks may be permanently mounted to the chassis and rotate to a horizontal position for travel and storage. Other methods of securing the front of the chassis to a truck bed may include ratchet straps or quick draw ratchet ropes in place of turn buckles.

I claim:

1. A chassis assembly configured for installation in a truck bed of a pickup truck, the chassis comprising:
    a bed portion including,
        a bed floor, the bed floor configured to substantially cover a floor of the truck bed,
        a bed left side, the bed left side including framework extending upwardly from a left side edge of the bed floor,
        a bed right side, the bed left side including framework extending upwardly from a right side edge of the bed floor, and
        a bed front side, the bed front side including framework extending upwardly from a front edge of the bed floor;
    a safety platform portion, the safety platform portion extending rearwardly of a back edge of the bed floor and being attached to the bed portion through one or more of the bed right side, the bed left side and the bed floor, the safety platform portion including,
        a safety floor, the safety floor being positioned at least 18 inches vertically below the bed floor, and
        left, right and rear side railings, the left, right and rear side railings extending upwardly from respective left, right and rear edges of the safety floor; and
    a trailer hitch mount, the trailer hitch mount being located proximate a front edge of the safety floor, the trailer hitch mount being configured for attachment with a trailer hitch receiver on the pickup truck.

2. The chassis assembly of claim 1, wherein the trailer hitch mount further comprises a substantially vertically orientated plate having one or more substantially vertically extending mount slots formed through the vertically orientated plate.

3. The chassis assembly of claim 1, further comprising a trailer hitch adapter, the trailer hitch adapter having (i) an elongated tube configured for receipt into and attachment to the trailer hitch receiver, and (ii) a mounting end, the mounting end configured to couple to the trailer hitch mount.

4. The chassis assembly of claim 3, wherein (a) the trailer hitch mount further comprises a substantially vertically orientated mount plate having one or more substantially vertically extending mount slots formed through the vertically orientated mount plate, and (b) the mounting end comprises a substantially vertically orientated adapter plate having one or more substantially vertically extending adapter slots formed through the vertically orientated adapter plate.

5. The chassis assembly of claim 4, further comprising one or more threaded fasteners extending through the both the one or more substantially vertically extending mount slots and the one or more substantially vertically extending adapter slots to secure the trailer hitch mount to the trailer hitch adapter.

6. The chassis assembly of claim 1 further comprising a lighted sign mounted to the bed front side and movable between a substantially vertically orientated deployed position and a substantially horizontal travel position.

7. The chassis assembly of claim 6, further comprising an electrical harness operatively attached to the lighted sign and including a plug for attachment to an electrical socket of the pickup truck.

8. The chassis assembly of claim 1 further comprising three or more removable jacks, the removable jacks being configured for selective attachment to the bed platform portion and the safety platform portion by way of three or more jack receiving mounts located on the bed and safety platform portions for raising and lowering the bed and safety platform portions.

9. The chassis assembly of claim 8, wherein each of the three or more jacks include a caster.

10. The chassis assembly of claim 8, wherein first and second jack receiving mounts of the three or more jack receiving mounts are located proximate intersections of (i) the bed left side and the bed front side, and (ii) the bed right side and the bed front side respectively.

11. The chassis assembly of claim 10, wherein a third jack receiving mount of the three or more jack receiving mounts is located proximate a rear edge of the safety floor.

12. The chassis assembly of claim 1, wherein The bed left side and the bed right side include left and right horizontal shelves respectively, wherein each of the horizontal shelves are configured to overhang respective left and right sides of the pickup bed of the pickup truck when installed in the pickup bed.

13. A combination comprising the chassis assembly of claim 1 and the pickup truck wherein the bed portion is received in the bed of the pickup truck with the trailer hitch mount being attached with a trailer hitch receiver of the pickup truck.

14. The combination of claim 13, wherein the bed portion is further attached to the truck bed by one or more turnbuckles.

15. A method of installing a chassis assembly on a pickup truck, the method comprising:
providing the chassis assembly, the chassis assembly comprising (1) a bed portion including (i) a bed floor, the bed floor configured to substantially cover a floor of the truck bed, (ii) a bed left side, the bed left side including framework extending upwardly from a left side edge of the bed floor, (iii) a bed right side, the bed left side including framework extending upwardly from a right side edge of the bed floor, and (iv) a bed front side, the bed front side including framework extending upwardly from a front edge of the bed floor, (2) a safety platform portion, the safety platform portion extending rearwardly of a back edge of the bed floor and being attached to the bed portion through one or more of the bed right side, the bed left side and the bed floor, the safety platform portion including (i) a safety floor, the safety floor being positioned at least 18 inches vertically below the bed floor, and (ii) left, right and rear side railings, the left, right and rear side railings extending upwardly from respective left, right and rear edges of the safety floor, (3) a trailer hitch mount, the trailer hitch mount being located proximate a front edge of the safety floor, the trailer hitch mount being configured for attachment with a trailer hitch receiver on the pickup truck, and (4) three or more removable jacks, each including a caster, the removable jacks being configured for selective attachment to the bed platform portion and the safety platform portion by way of three or more jack receiving mounts located on the bed and safety platform portions for raising and lowering the bed and safety platform portions, wherein first, second and third removable jacks of the three or more removable jacks are secured to the bed and safety portions through respective first, second and third jack receiving mounts with the height of the bed floor being greater than the height of the truck bed;
rolling the chassis assembly towards the truck bed moving the bed portion substantially into the truck bed;
lowering the removable jacks until the bed floor rests on the truck bed;
securing the trailer hitch mount with the trailer hitch receiver; and
removing the first, second, and third removable jacks.

16. The method of claim 15, further comprising securing the chassis assembly to the pickup truck with one or more turnbuckles.

17. The method of claim 16, wherein the chassis assembly includes an electrical harness and further comprises operationally coupling the electrical harness to an electrical connector on the pickup truck.

18. A method of removing a chassis assembly of claim 9 from a pickup truck, the method comprising:
providing the chassis assembly, the chassis assembly comprising (1) a bed portion including (i) a bed floor, the bed floor configured to substantially cover a floor of the truck bed, (ii) a bed left side, the bed left side including framework extending upwardly from a left side edge of the bed floor, (iii) a bed right side, the bed left side including framework extending upwardly from a right side edge of the bed floor, and (iv) a bed front side, the bed front side including framework extending upwardly from a front edge of the bed floor, (2) a safety platform portion, the safety platform portion extending rearwardly of a back edge of the bed floor and being attached to the bed portion through one or more of the bed right side, the bed left side and the bed floor, the safety platform portion including (i) a safety floor, the safety floor being positioned at least 18 inches vertically below the bed floor, and (ii) left, right and rear side railings, the left, right and rear side railings extending upwardly from respective left, right and rear edges of the safety floor, (3) a trailer hitch mount, the trailer hitch mount being located proximate a front edge of the safety floor, the trailer hitch mount being configured for attachment with a trailer hitch receiver on the pickup truck, and (4) three or more removable jacks, each including a caster, the removable jacks being configured for selective attachment to the bed platform portion and the safety platform portion by way of three or more jack receiving mounts located on the bed and safety platform portions for raising and lowering the bed and safety platform portions;

disconnecting the trailer hitch mount from the trailer hitch receiver;

securing first, second and third removable jacks of the three or more removable jacks to respective first, second, and third receiving mounts of the three or more receiving mounts;

raising a height of the chassis assembly until the bed floor is lifted off of the truck bed by adjusting lengths of the first, second, and third removable jacks; and rolling the chassis assembly out of the truck bed by moving it rearwardly.

19. A chassis assembly configured for installation in a truck bed of a pickup truck, the chassis comprising:
 a bed portion including,
  a bed floor, the bed floor configured to substantially cover a floor of the truck bed,
  a bed left side, the bed left side including framework extending upwardly from a left side edge of the bed floor,
  a bed right side, the bed left side including framework extending upwardly from a right side edge of the bed floor,
  a bed front side, the bed front side including framework extending upwardly from a front edge of the bed floor;
 a safety platform portion, the safety platform portion extending rearwardly of a back edge of the bed floor and being attached to the bed portion through one or more of the bed right side, the bed left side and the bed floor, the safety platform portion including,
  a safety floor, the safety floor being positioned about 20 inches vertically below the bed floor,
  left, right and rear side railings, the left, right and rear side railings extending upwardly from respective left, right and rear edges of the safety floor, and
  a trailer hitch mount, the trailer hitch mount being located proximate a front edge of the safety floor, the trailer hitch mount being configured for attachment with a trailer hitch receiver on the pickup truck;
 a trailer hitch adapter, the trailer hitch adapter having (i) an elongated tube configured for receipt into and attachment to the trailer hitch receiver, and (ii) a mounting end, the mounting end configured to couple to the trailer hitch mount; and
 three or more removable jacks, the removable jacks being configured for selective attachment to the bed platform portion and the safety platform portion by way of three or more jack receiving mounts located on the bed and safety platform portions for raising and lowering the bed and safety platform portions, each removable jack of the three or more removable jacks including a caster.

* * * * *